(12) United States Patent
Steinhauser et al.

(10) Patent No.: US 7,140,667 B2
(45) Date of Patent: *Nov. 28, 2006

(54) BODY STRUCTURE FOR A VEHICLE PARTICULARLY A PASSENGER CAR

(75) Inventors: Dieter Steinhauser, Remshalden (DE); Thomas Meier, Rheinstetten (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/606,148

(22) Filed: Jun. 26, 2003

(65) Prior Publication Data

US 2005/0264039 A1 Dec. 1, 2005

(30) Foreign Application Priority Data

Jun. 29, 2002 (DE) ................................. 102 29 399

(51) Int. Cl.
*B62D 29/04* (2006.01)
*B60R 21/13* (2006.01)
(52) U.S. Cl. .................................... 296/181.2; 280/756
(58) Field of Classification Search ........... 296/901.01, 296/181.2, 218; 280/756
See application file for complete search history.

(56) References Cited

U.S. PATENT DOCUMENTS 3,145,000 A 8/1964 Mackie

| 4,521,049 A | 6/1985 | Genma et al. |
| 6,883,857 B1* | 4/2005 | Steinhauser et al. ...... 296/181.2 |
| 2004/0130136 A1* | 7/2004 | Muller ........................ 280/756 |

FOREIGN PATENT DOCUMENTS

| DE | 4243186 | 6/1994 |
| DE | 4437245 | 4/1996 |
| DE | 20103001 | 7/2001 |
| DE | 1164073 | 12/2001 |
| EP | 0 286 058 A2 | 4/1988 |
| EP | 0685381 | 5/1995 |
| EP | 0 976 620 A1 | 6/1999 |
| WO | WO 98/29291 | 7/1998 |

* cited by examiner

*Primary Examiner*—Joseph D. Pape
(74) *Attorney, Agent, or Firm*—Crowell & Moring LLP

(57) ABSTRACT

For optimizing a body structure for a passenger car in the area of the vehicle occupant compartment and of the rollover bar device arranged behind the occupant seats, specifically with respect to a high stability under load, low weight and economical manufacturing, a wall structure of the vehicle occupant compartment extending adjacent to the vehicle occupant seats and the rollover bar device consisting of a high-strength non-metallic material, such as a fiber-reinforced plastic material, e.g., CKF, and being constructionally inseparably combined.

3 Claims, 2 Drawing Sheets

BODY STRUCTURE FOR A VEHICLE PARTICULARLY A PASSENGER CAR

BACKGROUND OF THE INVENTION

The present invention relates to a body structure for a vehicle, and more particularly to a structure for a passenger car having a vehicle occupant compartment with a rollover bar behind the seats.

EP 0 976 620 A1 describes an open passenger car which is provided with a rollover bar device fastened to a vehicle occupant compartment. The rollover bar device has a single rollover bar which spans a vehicle occupant space of the passenger car in the transverse direction of the vehicle and consists of a non-metallic material.

EP 0 286 058 A2 comprises a self-supporting structural element made of a composite material for a vehicle body. The structural element is formed by a wall part having an intermediate body which is bounded by cover layers. This structural element should have a good strength/weight ratio.

U.S. Pat. No. 3,145,000 discloses a high-strength, glass-fiber-reinforced component for a wing of an aerodynamic vehicle. The wing is provided with a wall section which has a core, for example, consisting of a honeycomb structure, embedded in covering walls.

SUMMARY OF THE INVENTION

An object of the present invention is to provide a vehicle body structure for a vehicle, particularly a passenger car, in which a rollover bar device is mounted in a highly stressable manner on a vehicle occupant compartment of the body structure. The rollover bar device, while having a low weight, is connectable in a simple and economical manner with the vehicle occupant compartment.

According to the invention, this object has been achieved by a wall structure extending adjacent to the vehicle occupant seats and the rollover bar device that consist of a high-strength non-metallic material, such as a fiber-reinforced plastic material, and that are constructionally inseparably combined.

Among the principal advantages achieved with the present invention are that the rollover bar device and the vehicle occupant compartment, because they consist of a high-strength non-metallic material, such as a fiber-reinforced plastic material, are optimized with respect to a lower weight and a high strength. Because of this selection of material and as a result of the type of connection, the vehicle occupant compartment and the rollover bar device can also be produced in an advantageous manner. In particular, their inseparable connection eliminates expensive screws whose bores have a cross-section-weakening effect. Furthermore, the individual rollover bars of the rollover bar device, which are constructed only in the area of the vehicle seats, contribute to obtaining constructive degrees of freedom.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

Figure 1:
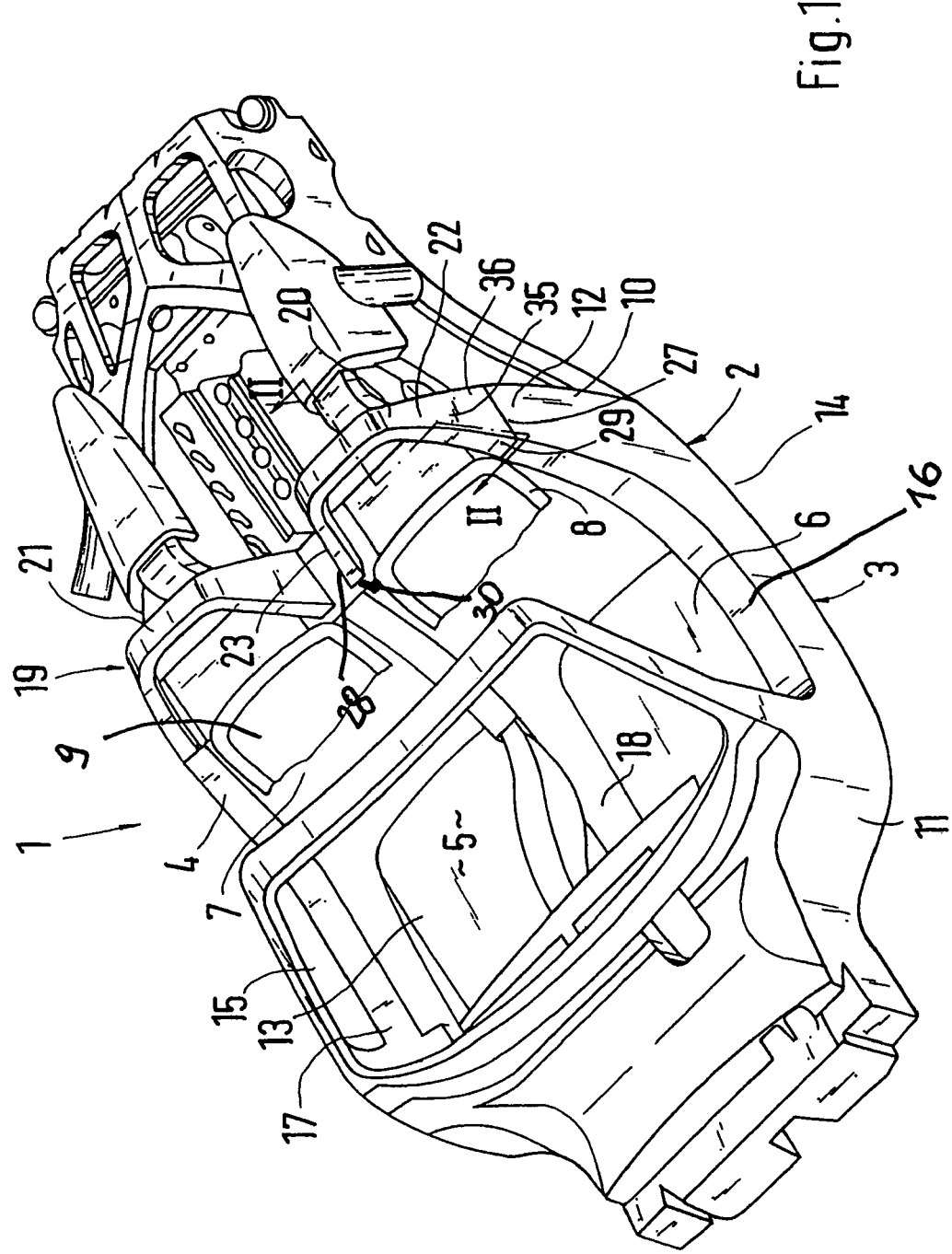
FIG. 1 is a perspective top view of a body structure of a passenger car according to the present invention.

For purposes of simplification, essentially only a vehicle body 2 comprising a vehicle body structure 3 of a passenger car 1 having an open construction is illustrated. The vehicle body structure has a vehicle occupant compartment 4 with a vehicle occupant space 5 having receiving devices 6, 7 for two vehicle occupant seats 8, 9, respectively, arranged side-by-side. The vehicle occupant compartment 4 consists of a non-metallic material, such as a fiber-reinforced plastic, material-composite material, and has a wall formation 10 with a forward wall structure 11 and a rearward wall structure 12 which are attached to a floor structure 13.

The floor structure 13 is bounded on the longitudinal sides 14, 15 by side members 16, 17 which have a box-shaped cross-section and extend between the wall structures 11, 12. The floor structure 13 has a transmission tunnel 18 extending between the forward wall structure 11 and the rearward wall structure. An example of a high-strength non-metallic material is found in above-mentioned EP 0 286 058 A1, and the material can be used with vehicle body structures of the type disclosed herein.

Behind the vehicle occupant seats 8, 9, a rollover bar device 19 is arranged adjacent to the rearward wall structure 12. The rollover bar device 19 extends transversely to the longitudinal direction A—A of the vehicle and is also produced of a high-strength non-metallic material, such as a fiber-reinforced plastic material (CFK). The rollover bar device 19 is constructionally, specifically inseparably, combined with the vehicle occupant compartment 4 or with the wall structure 12. The rollover bar device 19 is formed by two individual rollover bars 20, 21 which are mounted in the area of the receiving devices 6, 7 of the vehicle occupant seats 8, 9 on the rearward wall structure 12 and each has two upright rollover bar columns 22, 23.

Figure 2:
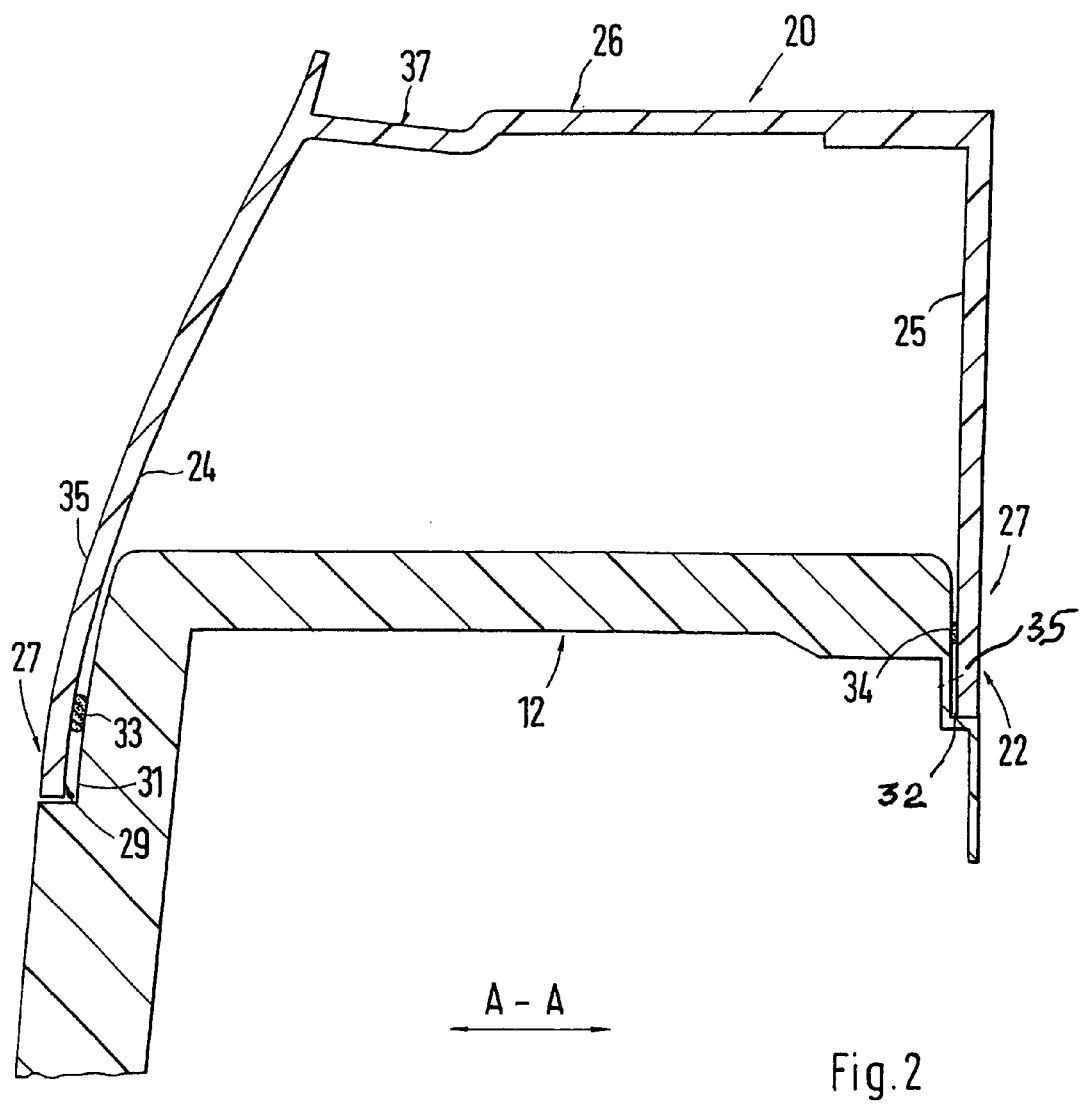
FIG. 2 is an enlarged sectional view along line II—II of FIG. 1.

In the sectional view of FIG. 2, each individual rollover bar, for example, 22, comprises upright leg walls 24, 25 spaced in the longitudinal direction A—A of the vehicle and a web wall 26 extending between the leg walls 24, 25. On the free ends 27, 28, the rollover bar columns 22, 23 have flange devices 29, 30 which extend to the rearward wall structure 12 and rest in recesses 31, 32 of the last-mentioned wall structure, specifically by way of glued portions 33, 34. The flange device 29 is provided with flanges 35, 36 which are aligned transversely to the longitudinal direction A—A of the vehicle. The web wall 26 is constructed for supporting, for example, a removable roof in a general known manner and has a groove 37 into which a sealing body can be inserted also in a generally known manner. The sealing body acts between the individual rollover bar 22 and the roof (not shown).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. Body structure for a vehicle having a vehicle occupant compartment, vehicle occupant seats and a rollover bar device arranged behind the vehicle occupant seats as viewed toward the rear of the vehicle and extending transversely to a longitudinal direction of the vehicle, wherein a wall structure of the vehicle occupant compartment extending adjacent to the vehicle occupant seats and the rollover bar device are comprised of a high-strength non-metallic, fiber-reinforced plastic material and are constructionally inseparably combined, the rollover bar device comprises two individual rollover bars mounted in an area of the vehicle occupant seats, each individual rollover bar comprises two upright rollover bar columns having upright leg walls and a web wall extending between the leg walls, and free ends of the rollover bar columns comprise flange devices configured to rest in recesses of the wall structure and are glued in position.

2. Body structure according to claim 1, wherein the flange devices have first flanges extending transversely to the longitudinal direction of the vehicle and second flanges aligned in the longitudinal direction of the vehicle.

3. Body structure according to claim 1, wherein the web wall is configured to support a roof and is provided with a groove to receive a sealing body.

* * * * *